United States Patent [19]

Kobayashi

[11] Patent Number: 4,507,695
[45] Date of Patent: Mar. 26, 1985

[54] TAPE RECORDER HAVING TRANSIT NOISE PREVENTING MEANS

[75] Inventor: Minoru Kobayashi, Tokyo, Japan

[73] Assignee: Olympus Optical Co., Ltd., Tokyo, Japan

[21] Appl. No.: 237,939

[22] Filed: Feb. 25, 1981

[30] Foreign Application Priority Data

Feb. 29, 1980 [JP]  Japan .................................. 55-24780

[51] Int. Cl.³ .............................................. G11B 5/54
[52] U.S. Cl. ..................................... 360/105; 360/137
[58] Field of Search ............... 360/105, 137, 96.1–96.6

[56] References Cited

U.S. PATENT DOCUMENTS

| 4,101,949 | 7/1978 | Cicatelli .............................. 360/137 |
| 4,118,745 | 10/1978 | Matsuura et al. ................... 360/96.3 |
| 4,149,203 | 4/1979 | Kobayashi et al. ...................... 360/60 |
| 4,212,040 | 7/1980 | Yoshida et al. ..................... 360/96.3 |
| 4,232,349 | 11/1980 | Kobayashi .......................... 360/105 |

FOREIGN PATENT DOCUMENTS 2713267  6/1977  Fed. Rep. of Germany ...... 360/105

*Primary Examiner*—John H. Wolfe
*Attorney, Agent, or Firm*—Frishauf, Holtz, Goodman & Woodward

[57] ABSTRACT

A tape recorder comprises transfer mechanism which is operatively connected to a power switch and transfers a head support lever to a position where a magnetic head is in contact with a tape upon shifting of the power switch to its "ON" position. The power switch has "ON", "OFF", and "EJECT" positions in order, and, when set in the "EJECT" position, rocks a rockable eject lever for cassette ejection.

11 Claims, 5 Drawing Figures

FIG. 1
FIG. 2
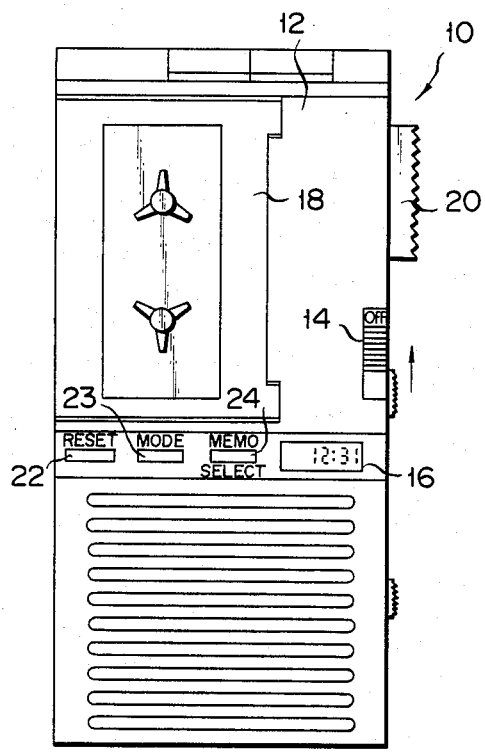
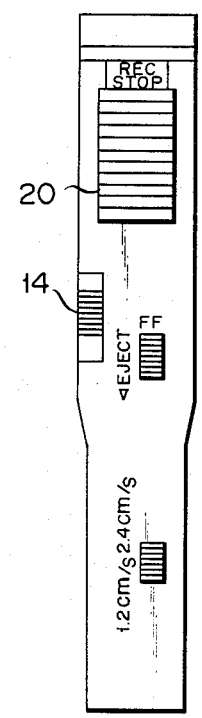

TAPE RECORDER HAVING TRANSIT NOISE PREVENTING MEANS

BACKGROUND OF THE INVENTION

This invention relates to a tape recorder, and more specifically to a tape recorder provided with a mechanism capable of preventing production of transit noise.

In conventional tape recorders, the operation modes are generally switched by operating slide buttons, push buttons, or touch buttons. In a tape recorder with a slide button, for example, a magnetic head and a pinch roller are shifted in connection with movement of a slidable button. Particularly, to set the tape recorder to the recording mode or reproducing mode, the magnetic head, as well as the pinch roller, must be moved to a recording-reproducing position. To move the head and pinch roller in this way the recorder needs to be provided with a number of components and must inevitably become complicated. In a tape recorder with push buttons, on the other hand, the magnetic head and pinch roller are shifted by depressing a recording button or a reproducing button. In this system, the magnetic head and pinch roller are attached to a lever connected to the recording button and the reproducing button in order to reduce the number of components used. This system, however, is defective because the magnetic head may be moved when not desired, if a small force is applied to the recording button or the reproducing button. Accordingly, there is needed a mechanism for preventing the shifting of the head, so that it is impossible to reduce the number of components of the tape recorder as a whole. In a tape recorder with touch buttons a solenoid or a motor must be provided exclusively for moving the pinch roller and magnetic head. The chassis of the tape recorder should be large to support the solenoid or motor. Further, use of the solenoid or motor increases the cost of the tape recorder.

In any of the prior art systems, as described above, it is necessary to move the magnetic head in setting the recording mode, so that transit noise may be recorded. Also, in the setting of the reproducing mode, transit noise will be produced accompanying the transfer of the magnetic head. Especially in dictating machines which are subject to frequent switching between the recording and stop modes, removal of the transit noise is necessary.

SUMMARY OF THE INVENTION

It is therefore an object of this invention to provide a tape recorder capable of effectively preventing production of transit noise.

To this end, according to the invention, a magnetic head is previously transferred to a position where it comes in contact with a tape upon shifting of a power switch to its "ON" position. Accordingly, the magnetic head will never be moved thereafter even though the recording or reproducing mode is established, so that production of transit noise will perfectly be prevented.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 1 and 2 are a plan view and a right side view of a tape recorder according to an embodiment of this invention, respectively;

DETAILED DESCRIPTION OF THE PREFERRED EMBODIMENT

Figure 3:
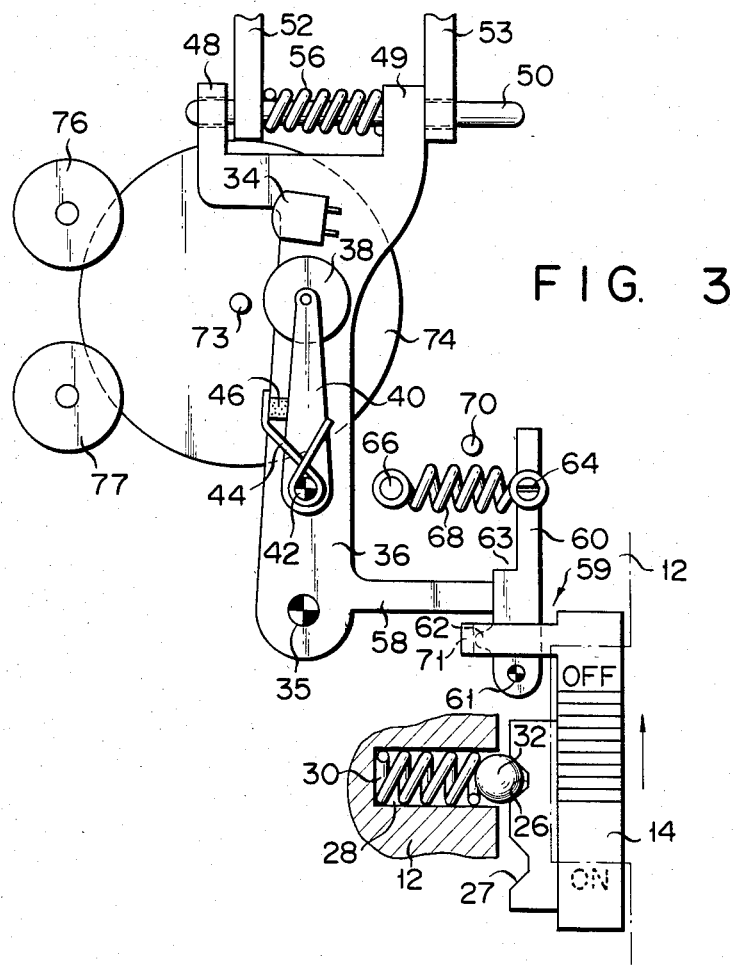
FIGS. 3 and 5 are plan views showing some components of the tape recorder in which a power switch is in "OFF" and "ON" positions, respectively.

As shown in FIGS. 1 and 2, a tape recorder 10 according to the invention comprises a slidable power switch 14 adjoining the edge portion between the top and the right side face of a recorder body 12. The power switch 14 is in the form of a power eject button also serving as an eject button. "OFF" and "ON" are marked at the upper and lower end portions of the top surface of the power switch 14, respectively. These marks or indications are alternately hidden in the recorder body 12 by the slide of the power switch 14 so that only one of the indications may be exposed to the outside. The power switch 14 is in its "OFF" position in FIG. 1, and may be shifted to the "ON" position by sliding in the direction of the arrow. In the "ON" position, the power supply is kept at stand-by, the indication on a counter 16 is set to zero, and a magnetic head and a pinch roller are shifted to positions where they abut a tape.

Numeral 18 designates a cassette cover for a cassette holder, while numeral 20 designates a slidable control button attached to the right side face of the recorder body 12, whereby the switching between recording, stop, reproducing, and rewinding modes is made with a single operation. Further, numerals 22 to 24 denote reset, mode, and memory buttons, respectively.

When the power switch 14 is shifted from the "OFF" position to the "ON" position, the magnetic head and pinch roller are brought into contact with the tape. Cassette ejection may be effected by moving the power switch 14 beyond the "OFF" position in the direction of the arrow in FIG. 1.

Referring now to FIG. 3, there will further be described components of the tape recorder 10. The power switch 14 is provided in its inner surface with a pair of locating holes or click holes 26 and 27 in the shape of a truncated cone. The power switch 14 is located in place when a steel ball 32, which is contained together with a compression coil spring 30 in a recess 28 formed in the recorder body 12, is fitted in one of the click holes by the biasing force of the spring. In this arrangement, the steel ball 32 is fitted in the click hole 27 when the power switch 14 is in the "ON" position, and in the click hole 26 when the switch is "OFF". The tape recorder 10 further comprises a head support lever 36 which is rockably mounted on a chassis (not shown) by means of a pivot pin 35 and supports a magnetic head 34. A pinch roller support lever 40 is supporting a pinch roller 38 at one end is rockably mounted on the head support lever 36 by means of a pivot pin 42. Wound around the pivot pin 42 is a torsion coil spring 44 both ends of which engage with the right side of the pinch roller support lever 40 and the left side of the head support lever 36, respectively. The pinch roller support lever 40 is urged by the biasing force of the spring 44 to rock counterclockwise around the pivot pin 42 at its rocking center, and is regulated in its rocking position by a buffer member 46 of e.g. felt attached to the spring 44. The free end of the head support lever 36 forms a fork end having a pair of prongs 48 and 49 between which a shaft 50 is fixedly stretched. The shaft 50 extends through holes of a pair of supports 52 and 53 formed on the recorder body 12. The head support lever 36 is biased to rock clockwise around the pivot pin 35 by the biasing force of a return spring 56 in the form of a compression coil spring wound around the shaft 50 between the support 52 and the prong 49. The normal position of the head support lever 36 is regulated with the prong 49 pressed against the support 53. Further, the head support lever 36 has an integral projecting strip 58 which adjoins a retaining means 59. The retaining means 59 is provided with a control lever 60 rockably mounted on the chassis by means of a pivot pin 61. The control lever 60 has a cam strip 62 and a retaining groove 63 on one side adjacent to the projecting strip 58. The control lever 60 is biased to rock counterclockwise around the pivot pin 61 by the biasing force by a tension coil spring 68 stretched between a strip 64 protruding from the top of the lever 60 and a pin 66 on the chassis. The normal position of the control lever 60 is regulated by the engagement between one side thereof and the tip end face of the projecting strip 58. Further mounted on the chassis is a stop pin 70 on which the control lever 60 can abut. The power switch 14 is provided with an integral engaging strip 71 which extends downward so as to be able to engage with the cam strip 62 when the projecting strip 58 and the control lever 60 rock in the counterclockwise direction. A capstan shaft 73 is mounted adjacent to the pinch roller 38 on the chassis, and a flywheel 74 is fixed on the capstan shaft 73. The retaining means 59 and the engaging strip 71 form a transfer means which is operatively connected with the power switch 14 and transfers the head support lever 36 to a position where the magnetic head 34 is in contact with the tape upon shifting of the power switch to the "ON" position. Numerals 76 and 77 designate a rewinding reel and a take-up reel, respectively.

Figure 4:
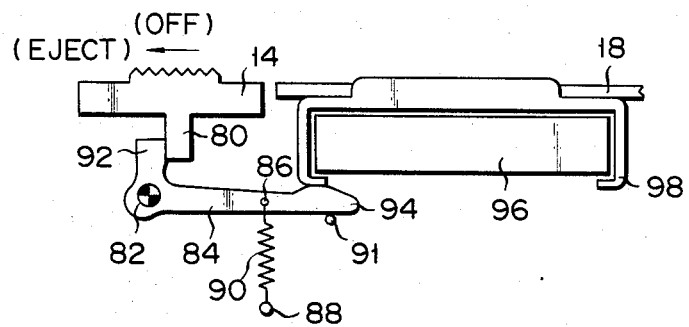
FIG. 4 is a right side view of the power switch showing the relationship between the power switch and an eject lever (unrelated members not shown).

As shown in FIG. 4, moreover, the power switch 14 is provided integrally with a downwardly projecting strip 80. An L-shaped eject lever 84 is rockably mounted on the chassis by means of a pivot pin 82. The eject lever 84 is biased to rock clockwise around the pivot pin 82 and pressed against a stop pin 91 by the biasing force of a return spring 90 in the form of a tension coil spring stretched between a hole 86 in the eject lever 84 and a pin 88 erected on the chassis. The normal position of the eject lever 84 is regulated with one arm 92 thereof engaging with the downwardly projecting strip 80 of the power switch 14. The other arm 94 of the eject lever 84 is disposed in a position where it can eject a cassette holder 98 receiving a cassette 96 therein. Accordingly, when the power switch 14 is further moved to the left from the "OFF" position as shown in FIG. 4, the eject lever 84 is rocked counterclockwise around the pivot pin 82 to eject the cassette holder 98 with the cassette 96, according to the shift of the power switch 14.

Figure 5:
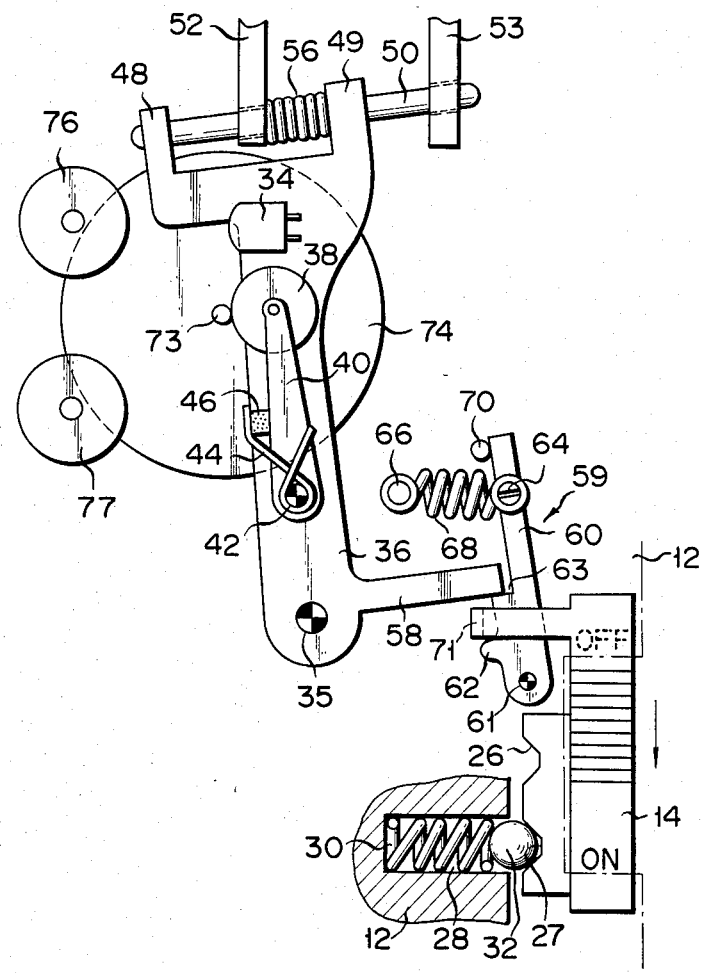

In the tape recorder 10 of the above-mentioned construction, when the power switch 14 is slid from the "OFF" position in the direction of the arrow of FIG. 3, the steel ball 32 leaves the click hole 26 against the biasing force of the spring 30. Then, the engaging strip 71 of the power switch 14 abuts on the projecting strip 58 of the head support lever 36 to rock the lever 36 counterclockwise around the pivot pin 35 against the biasing force of the spring 56. When the head support lever 36 is rocked to a position where the head 34 and the pinch roller 38 are brought in contact with the tape, the projecting strip 58 is fitted in the retaining groove 63 of the control lever 60, and at the same time the control lever 60 is rocked counterclockwise around the pivot pin 61 by the biasing force of the spring 68 until it runs against the stopper pin 70. As a result, the projecting strip 58 of the head support lever 36 is biased to be retained in the retaining groove 63 by the biasing force of the spring 56, thereby maintaining the head 34 and the pinch roller 38 at the stand-by position in which they are in contact with the tape. When the head support lever 36 is rocked counterclockwise until it engages with the control lever 60, the power switch 14 is slightly moved in the opposite direction to the arrow of FIG. 3 with the steel ball 32 fitted entirely in the click hole 27. Then, in the "ON" position where the steel ball 32 is fitted in the click hole 27 as shown in FIG. 5, the indication "ON" of the power switch 14 is exposed to the outside without being hidden in the recorder body 12, thereby indicating that the power switch 14 is "ON".

Further, when the power switch 14 is slid in the direction of the arrow to return the power switch 14 from the "ON" position to the "OFF" position, the engaging strip 71 of the power strip 14 first engages with the cam strip 62 of the control lever 60. When the engaging strip 71 engages with the cam strip 62, the power switch 14 rocks the control lever 60 clockwise around the pivot 61 against the biasing force of the spring 68. When the control lever 60 rocks in the clockwise direction according to the slide of the power switch 14, the projecting strip 58 leaves the retaining groove 63 and at the same time rocks in the clockwise direction as the head support lever 36 is biased to rock clockwise around the pivot pin 35 by the biasing force of the spring 56. When the power switch 14 is shifted to the "OFF" position, the head support lever 36 is returned to its normal position where its prong 49 is pressed against the support 53, and the magnetic head 34 and the pinch roller 38 are returned to their respective normal positions where they are not in contact with the tape.

According to this invention, as described above, the magnetic head is previously shifted by the transfer means to the position where it is in contact with the tape upon shifting of the power switch to the "ON" position, and thereafter the recording or reproducing mode is established by operating the control button. Thus, the magnetic head is not moved in the setting of the recording and reproducing modes, so that production of transit noise may be prevented effectively. Therefore, the invention may suitably be applied to dictating machines in which the recording and reproducing modes are frequently set. This arrangement is advantageous in that the action of the head support lever need only by regulated by a retaining means including e.g. a control lever and in that it comprises fewer components than other conventional arrangements and has a simpler structure. Further, the power switch is provided independently of the control button, so that, even if the control button is inadvertently moved in a pocket or bag, erroneous operation can be prevented by keeping the power switch in the "OFF" position. Thus, there will never be caused any unexpected tape running or battery loss.

Moreover, the power switch also serves as an eject button, and can be moved beyond the "OFF" position to the "EJECT" position to be set thereto. In such arrangement, cassette ejection cannot be effected when the power switch is in the "ON" position, and can be achieved only when the power switch is further moved to an "EJECT" position after reaching the "OFF" position. Thus, cassette ejection is prohibited in the state where the magnetic head and pinch roller are in contact with the tape, so that erroneous cassette ejection can be avoided, and there is no possibility of damaging the magnetic head, pinch roller, or tape.

Although in the above-mentioned embodiment the pinch roller, along with the magnetic head, is shifted to the position where it is in contact with the tape upon shifting of the power switch to the "ON" position, this invention is not limited to such embodiment. That is, the pinch roller may be so constructed as to move with the control button. Furthermore, the head support lever and control lever, which are rockable in the above-mentioned embodiment, may be so designed as to able to reciprocate.

What is claimed is:

1. In a multi mode tape recorder having a plurality of operating modes, comprising a source of power; a power switch for controlling said source of power, said power switch having at least a power "ON" position; a mode selection member for changing the operation modes of the tape recorder; a movable pinch roller support lever supporting a pinch roller which can contact a tape to drive said tape; and a movable head support lever supporting a magnetic head and movable between an original position where said magnetic head is spaced away from said tape and a second position where said magnetic head is in contact with said tape; the improvement comprising:
   said power switch being separate from said control member and being operable independently of said control member; and
   transfer means operatively coupled to said power switch for transferring said head support lever from said original position where said magnetic head is spaced away from said tape to said second position where said magnetic head is in contact with said tape when said power switch is moved to its power "ON" position, said transfer means transferring said head support lever to said second position independently of operation of said mode selection control member.

2. The tape recorder of claim 1, wherein said transfer means is coupled to said pinch roller support lever for transferring said pinch roller support lever to a position where said pinch roller is in contact with said tape when said power switch is moved to its power "ON" position.

3. The tape recorder of claim 1 or 2, wherein said transfer means includes:
   an engaging strip formed on said power switch for engaging said head support lever to transfer said head support lever to its said second position where said magnetic head is in contact with said tape when said power switch is moved to its power "ON" position; and
   retaining means for retaining said head support lever in its said second position where said magnetic head is in contact with said tape.

4. The tape recorder of claim 3, wherein:
   said retaining means includes a rockable control lever and a spring to bias said rockable control lever to rock in a predetermined direction, said rockable control lever having a retaining groove for retaining said head support lever and a cam strip on which said engaging strip abuts to rock said control lever against the biassing force of said spring so that the retention of said head support lever by said control lever is released; and
   further comprising said biasing means coupled to said head support lever for biasing said head support lever in a direction toward said original position of said head support lever where said magnetic head is not in contact with said tape.

5. The tape recorder of claim 1 or 2,
   further comprising an L-shaped rockable eject lever for ejecting a cassette from the tape recorder; and
   wherein said power switch comprises a slidable member having a downwardly projecting strip, and has at least "ON", "OFF" and "EJECT" positions, said downwardly projecting strip pressing one arm of said L-shaped rockable eject lever to rock said eject lever to eject a cassette when said power switch is set at said "EJECT" position.

6. The tape recorder of claim 5, wherein said transfer means includes:
   an engaging strip formed on said power switch for engaging said head support lever to transfer said head support lever to its said second position where said magnetic head is in contact with said tape when said power switch is moved to its power "ON" position; and
   retaining means for retaining said head support in its said second position where said magnetic head is in contact with said tape.

7. The tape recorder of claim 6, wherein:
   said retaining means includes a rockable control lever and a spring to bias said rockable control lever to rock in a predetermined direction, said rockable control lever having a retaining groove for retaining said head support lever and a cam strip on which said engaging strip abuts to rock said control lever against the biasing force of said spring so that the retention of said head support lever by said control lever is released; and
   further comprising biasing means coupled to said head support lever where said magnetic head is not in contact with said tape.

8. The tape recorder of claim 5, wherein at least two of said operating modes are a recording mode and a reproducing mode, and wherein said transfer means includes means for maintaining said head support lever at said second position so as to keep said magnetic head in contact with said tape when said control member changes the operating mode between said record mode and said reproducing mode.

9. The tape recorder of claim 5, wherein at least two of said operating modes are a recording mode and a reproducing mode, and wherein said transfer means includes means for maintaining said support lever at said second position when said mode is switched from another mode to said recording or to said reproducing mode, thereby maintaining said magnetic head in contact with said tape during switching of modes to said recording and reproducing modes.

10. The tape recorder of claim 1, wherein at least two of said operating modes are a recording mode and a reproducing mode, and wherein said transfer means includes means for maintaining said head support lever at said second position so as to keep said magnetic head in contact with said tape when said control member changes the operating mode between said record mode and said reproducing mode.

11. The tape recorder of claim 1, wherein at least two of said operating modes are a recording mode and a reproducing mode, and wherein said transfer means includes means for maintaining said support lever at said second position when said mode is switched from another mode to said recording or to said reproducing mode, thereby maintaining said magnetic head in contact with said tape during switching of modes to said recording and reproducing modes.

* * * * *

UNITED STATES PATENT AND TRADEMARK OFFICE
CERTIFICATE OF CORRECTION

PATENT NO. : 4,507,695

DATED : March 26, 1985

INVENTOR(S) : Minoru KOBAYASHI

It is certified that error appears in the above-identified patent and that said Letters Patent is hereby corrected as shown below:

COLUMN 5 (Claim 1), line 28, change "mode selection member" to --mode selection control member--;

COLUMN 5 (Claim 1), last line, after "control member", insert --and maintaining said head support lever at said second position independently of operation of said control member--.

Signed and Sealed this

Seventeenth Day of September 1985

[SEAL]

Attest:

Attesting Officer

DONALD J. QUIGG

Commissioner of Patents and Trademarks—Designate